US005848150A

United States Patent [19]
Bingel

[11] Patent Number: 5,848,150
[45] Date of Patent: Dec. 8, 1998

[54] PASSIVE DISTRIBUTED FILTER SYSTEM AND METHOD

[75] Inventor: Thomas J. Bingel, Belleair Beach, Fla.

[73] Assignee: Paradyne Corporation, Largo, Fla.

[21] Appl. No.: 805,606

[22] Filed: Feb. 26, 1997

Related U.S. Application Data

[60] Provisional application No. 60/032,754 Dec. 17, 1996, provisional application No. 033,660 Dec. 17, 1996, provisional application No. 60/034,457 Dec. 31, 1996 and provisional application No. 60/037,455 Feb. 6, 1997.

[51] Int. Cl.$^6$ ............................. H04M 1/00; H04M 11/00
[52] U.S. Cl. ..................................... 379/399; 379/93.09
[58] Field of Search ............................. 379/93.01, 93.09, 379/402, 350, 93.05, 215, 184, 90.01; 333/17.1, 201, 202

[56] References Cited

U.S. PATENT DOCUMENTS

| | | | |
|---|---|---|---|
| 3,810,033 | 5/1974 | Grace ........................................ | 330/287 |
| 4,302,629 | 11/1981 | Foulkes et al. ........................... | 370/483 |
| 4,330,687 | 5/1982 | Foulkes et al. ........................... | 370/214 |
| 4,593,389 | 6/1986 | Wurzburg et al. ....................... | 370/524 |
| 4,660,218 | 4/1987 | Hashimoto ............................. | 379/93.09 |
| 4,825,465 | 4/1989 | Ryan ....................................... | 379/399 |
| 4,853,949 | 8/1989 | Schorr et al. ............................. | 379/2 |
| 4,987,586 | 1/1991 | Gross et al. .......................... | 379/93.09 |
| 5,151,972 | 9/1992 | Lorenz et al. ...................... | 379/100.16 |
| 5,191,305 | 3/1993 | Frost et al. .............................. | 333/202 |
| 5,237,591 | 8/1993 | Javitt et al. .............................. | 375/25 |
| 5,263,081 | 11/1993 | Nightingale et al. ................. | 379/90.01 |
| 5,289,538 | 2/1994 | Lauer et al. ............................ | 379/402 |
| 5,347,566 | 9/1994 | Law et al. ................................. | 379/27 |
| 5,440,335 | 8/1995 | Beveridge ................................ | 348/13 |
| 5,448,635 | 9/1995 | Beihl et al. .............................. | 379/399 |
| 5,497,417 | 3/1996 | Brahms et al. .......................... | 379/399 |
| 5,502,760 | 3/1996 | Gilbert et al. ......................... | 379/93.05 |
| 5,566,239 | 10/1996 | Garcia et al. ........................... | 379/399 |
| 5,623,543 | 4/1997 | Cook ....................................... | 379/402 |
| 5,625,677 | 4/1997 | Feiertag et al. ........................... | 379/93 |
| 5,627,081 | 5/1997 | Biran et al. ............................. | 333/17.1 |
| 5,627,885 | 5/1997 | Paneth et al. ............................. | 379/93 |
| 5,757,803 | 5/1998 | Russell et al. ........................... | 370/494 |

OTHER PUBLICATIONS

ADSL and VADSL Splitter Design and Telephony Performance, Cook, et al., IEEE Jorunal on Selected Areas in Communication, vol. 13, No. 3, Dec. 1995.

*Primary Examiner*—Krista Zele
*Assistant Examiner*—Charles N. Appiah
*Attorney, Agent, or Firm*—Thomas, Kayden, Horstemeyer & Risley, LLP

[57] ABSTRACT

A plurality of passive distributed POTS filters (DPF) are associated with a respective plurality of POTS communications devices and decouple a POTS channel from a telephone connection, while permitting and not interfering with a second communications channel (e.g., DSL, ADSL, SDSL, RADSL, VADSL, etc.) on the telephone connection that is utilized by a modem. In architecture, the DPF system includes a plurality of POTS communications devices, such as telephones, and a plurality of the DPFs corresponding respectively with and connecting each of the POTS communications devices to the telephone connection. Each of the DPFs comprise an automatic control mechanism and a POTS filter. The automatic control mechanism is configured to isolate the POTS filter when a respective POTS communications device is on-hook. Each DPF is configured to permit POTS communications over a POTS channel on the telephone connection with the respective POTS communications device when the POTS communications device is off-hook. Furthermore, a second communications device, such as a DSL (e.g., ADSL, SDSL, RADSL, VADSL, etc.) communications device, is connected to the telephone connection and communicates signals over a second channel. The POTS and second channel are communicated over the telephone connection concurrently without appreciable interference.

27 Claims, 6 Drawing Sheets

PASSIVE DISTRIBUTED FILTER SYSTEM AND METHOD

For this application and pursuant to 35 U.S.C. Section 120, the inventors herein claim priority to and the benefit of the filing date of the following copending commonly assigned provisional applications: "IMPROVED DISTRIBUTED POTS FILTER METHOD FOR SIMULTANEOUS DSL AND POTS COMMUNICATION ON EXISTING CUSTOMER PREMISE WIRING", filed Dec. 17, 1996, and assigned Ser. No. 60/032,754, "DIGITAL SUBSCRIBER LOOP DATA COMMUNICATIONS METHOD ENABLING SIMULTANEOUS DATA AND POTS WITHOUT POTS FILTERS/SPLITTERS OR SPECIAL PREMISES WIRING", filed Dec. 17, 1996, and assigned Ser. No. 60/033,660, "INTEGRATED POTS FILTER", filed Dec. 30, 1996, and assigned Ser. No. 60/034,457, and "PASSIVE POTS FILTER WITH IMPROVED SIDETONE", filed Feb. 6, 1997, and assigned Ser. No. 60/037,445. The foregoing documents are incorporated herein by reference.

FIELD OF THE INVENTION

The present invention generally relates to the art of data communications and telephony, and, more particularly, to a passive distributed filter system and method for enabling reliable and efficient decoupling of two simultaneous communications channels on a telephone connection at a plurality of sites. The passive distributed filter system and method are particularly suited for decoupling a plain old telephone system (POTS) channel on a telephone connection for a plurality of POTS communications devices, while permitting and not interfering with another communications channel (e.g., digital subscriber line (DSL), asymmetric DSL (ADSL), symmetric ADSL (SDSL), rate adaptive digital subscriber line (RADSL), very high speed ADSL (VADSL), etc.) that is communicated simultaneously with the POTS channel on the telephone connection. In this context, the invention is referred to as a distributed POTS filter (DPF).

BACKGROUND OF THE INVENTION

Recently, in the art of telephony, 2-wire copper telephone connections have been utilized for communicating two simultaneous channels, such as both digital data and analog voice signals. For example, a high speed digital subscriber line (DSL) channel (e.g., ADSL, SDSL, RADSL, VADSL, etc.) and a plain old telephone system (POTS) channel can be established over a single physical 2-wire connection. The signals are typically separated in frequency. The POTS channel usually exhibits a frequency spectrum of about 0 KHz to about 4 KHz, whereas the ADSL channel exhibits a frequency spectrum of about 20 KHz to about 500 KHz.

A POTS splitter is utilized to decouple the channels. A POTS splitter is typically a passive or active one-to-two port device. It often includes a low pass filter to minimize high frequency transients produced by on-hook/off-hook transitions so as to prevent tainting or slowing of the high speed data on the DSL channel. Also, it is usually configured to provide a high impedance to the telephone line in the ADSL frequency band in order to prevent ADSL power from being imparted on the POTS communications device that is connected to the line. Because of the foregoing requisite functionality, POTS splitters are usually expensive devices and are oftentimes installed on a physical wall of a premise, such as on an outside wall of a building. Furthermore, generally, POTS splitters require installation by a skilled telephone company worker, not the premise owner, resulting in undesirable installation time, labor, and expense.

The specification of POTS splitters has been the subject of several industry standards bodies. For example, see American National Standards Institute, ANSI T1.413-1995, Sections 8 and 10, regarding ADSL/POTS splitters. Moreover, as an example of a possible implementation of a POTS splitter, see J. Cook, P. Sheppard, "ADSL and VADSL Splitter Design and Telephony Performance," *IEEE Journal on Selected Areas in Communications*, December 1995.

A heretofore unaddressed need exist in the industry for an improved system and method for more efficiently and inexpensively implementing POTS splitters.

SUMMARY OF THE INVENTION

Briefly described, the present invention provides for a passive distributed filter system and method for enabling decoupling of first and second simultaneous communications channels on a telephone connection. The passive distributed filter system and method are particularly suited for decoupling a plain old telephone system (POTS) channel on a telephone connection for a plurality of POTS communications devices located at a plurality of different sites, while permitting and not appreciably interfering with another communications channel (e.g., DSL, ADSL, SDSL, RADSL, VADSL, etc.) that is communicated simultaneously with the POTS channel on the telephone connection. In this context, the invention is referred to as a distributed POTS filter (DP) system.

In architecture, the passive distributed filter system is constructed as follows. A plurality of first communications devices (e.g., telephones or other POTS devices) at various sites in a premise, as an example, are connected to a telephone connection by way of a respective plurality of passive distributed filters. Each distributed filter comprises a passive automatic control mechanism and a passive first channel filter (e.g., a POTS filter). The first channel filter is a one-to-one port device, unlike conventional POTS splitters, which are generally one-to-two port devices. The automatic control mechanism is configured to isolate the first channel filter when a respective first communications device is inactive (on-hook). Further, the distributed filter is configured to interface communications on a first channel (e.g., POTS) on the telephone connection with the respective first communications device when the first communications device is active (off-hook). Moreover, a second communications device (e.g., an DSL, ADSL, SDSL, RADSL, or VADSL modem) is connected to the telephone connection and communicates signals over a second channel (e.g., DSL, ADSL, SDSL, RADSL, VADSL, etc.), simultaneously with the first channel. As a result of the invention, an inexpensive passive distributed filter associated with each POTS device prevents on-hook/off-hook transitions from interfering with the second channel communications.

The invention can also be conceptualized as providing a method for implementing a passive distributed filter system for enabling decoupling of first and second communications channels on a telephone connection at a plurality of sites. In this regard, the method can be broadly summarized as follows: (a) interfacing a plurality of first channel communications devices with the telephone connection using a distributed filter, the first channel communications devices configured to communicate over the telephone connection via a first channel, the distributed filter comprising an automatic control mechanism and a first channel filter, the automatic control mechanism configured to isolate the first channel filter when a respective first communications device is inactive, the distributed filter configured to interface communications on a first channel on the telephone connection with the respective first communications device when the first communications device is active; (b) interfacing a second channel communications device to the telephone connection, the second channel communications device configured to communicate over the telephone connection via a second channel; and (c) permitting noninterfering simultaneous communications via the first and second channels over the telephone connection.

The invention has numerous advantages, a few of which are delineated hereafter, as merely examples.

An advantage of the invention is that it can be used in any data communication environment where a single physical connection (2-wire) has at least two communications channels (e.g., a high speed DSL, ADSL, SDSL, RADSL, or VADSL link in combination with a POTS link), where the channels are separated by frequency.

Another advantage of the invention is that it can be used to affect economical deployment of a DSL, ADSL, SDSL, RADSL, or VADSL communications channel simultaneously in combination with a POTS communications channel on a telephone connection.

Another advantage of the invention is that its automatic control mechanism acts as an automatic switch, to connect a POTS filter when a telephone is off-hook and to disconnect the POTS filter when the telephone is on-hook, without adversely affecting communications on the other simultaneous communications channel. The on-hook/off-hook transition is totally transparent to the user, and all telephone functions work as usual (ringer, pulse, and tone dialing, voice communication, etc.).

Another advantage of the invention is that it is simple in design, efficient in operation, and easily and economically manufactured on a mass scale.

Another advantage of the invention is that it can be employed within a conventional telephone, thereby producing an integrated system. In this regard, telephone manufacturers can produce and sell telephones that are capable of operating in a two channel system. For example, a telephone manufacturer may sell a telephone that is "ADSL ready" in that it can be utilized with a connection having both a POTS channel and an ADSL channel.

Another advantage of the invention is that it provides for an improved POTS filter with better sidetone than conventional POTS filters.

Another advantage of the invention is that it utilizes very low cost passive components.

Another advantage of the invention is that it is suitable for homeowners in that it does not require sophisticated installation.

Another advantage of the invention it that it meets surge and safety requirements of industry standard UL1950, Third Edition, and applicable requirements of FCC, Part 68.

Other objects, features, and advantages of the present invention will become apparent to one with skill in the art upon examination of the following drawings and detailed description. It is intended that all such additional objects, features, and advantages be included herein within the scope of the present invention, as is defined in the appended claims.

BRIEF DESCRIPTION OF THE DRAWINGS

The invention can be better understood with reference to the following drawings. The drawings are not necessarily to scale, emphasis instead being placed upon clearly illustrating principles of the present invention. Furthermore, in the drawings, like reference numerals designate corresponding part throughout the several views.

DETAILED DESCRIPTION OF THE PREFERRED EMBODIMENT

Figure 1:
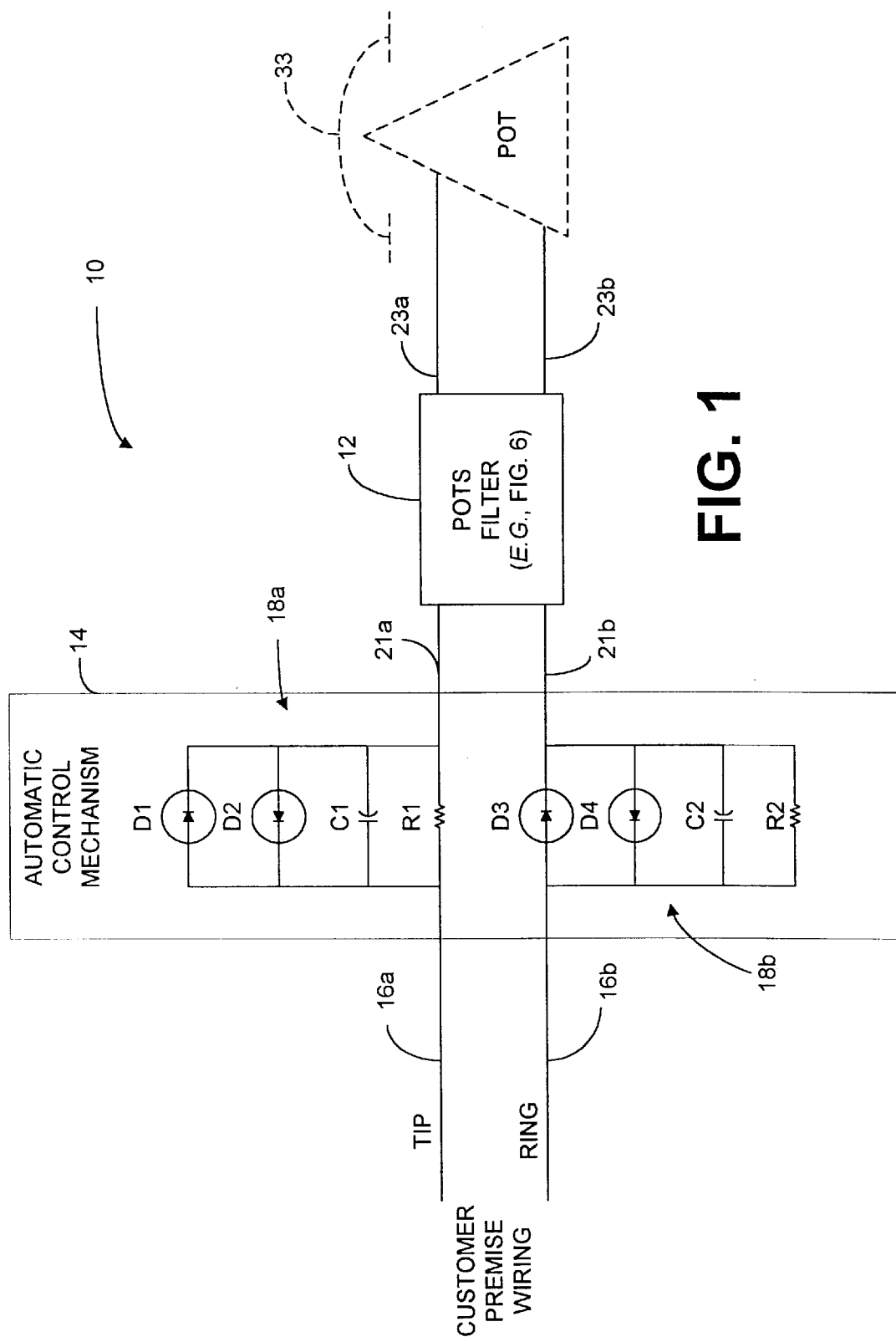
FIG. 1 is a circuit diagram of a distributed POTS filter (DPF) in accordance with the present invention.

A distributed filter, and particularly, a distributed POTS filter (DPF), in accordance with the present invention is illustrated in FIG. 1 and is generally denoted by reference numeral 10. It can be utilized to decouple two communication channels on a single 2-wire telephone connection that are separated by frequency. In the preferred embodiment, the DPF 10 is utilized in connection with a POTS channel and another high speed channel, such as a digital subscriber line (DSL) channel (e.g., ADSL, SDSL, RADSL, VADSL, etc.).

The architecture of the DPF 10 will be described first and then the operation thereafter. In architecture, as illustrated in FIG. 1, the DPF 10 generally includes a POTS filter 12 connected in series with an automatic control mechanism 14.

The automatic control mechanism 14 is designed to be connected directly to the customer premise wiring 16, particularly, tip and ring connections 16a, 16b, which are in turn connected to respective tip and ring lines of a conventional telephone connection 23. The automatic control mechanism 14 is configured to automatically either isolate or interface the POTS filter 12 (in the telephony voice spectrum) based upon the off-hook/on-hook status, respectively, of POTS communications devices 33 relative to the a customer premise wiring 16. In the context of this document, POTS communications devices include devices that operate on the Public Switched Telephone Network (PSTN), for example but not limited to, telephones, speakerphones, analog modems, facsimile machines, cordless phones, etc.

Structurally, the preferred embodiment of the automatic control mechanism 14 is implemented as a balanced network in that the circuitry connected to the tip and ring lines is equivalent. In the balanced configuration, each side comprises two diodes, one capacitor, and one resistor. More specifically, referring to FIG. 1, tip line circuitry 18a includes the following parallel components: diode D1, diode D2, capacitor C1, and resistor R1. Ring line circuitry 18b includes the following circuit components: diode D3, diode D4, capacitor C2, and resistor R2 having values that correspond with D1, D2, C1, and R1, respectively. In the preferred embodiment, D1–D4 are model D1N4001 diodes, C1 and C2 are 10 nF, and R1 and R2 are 10 KΩ.

The functionality of the aforementioned circuit elements is as follows. When a telephone or other POTS communications device 33 is on-hook, the direct current (DC) resistance of the POTS communications device 33 is greater than 5 MΩ. In this event, very little current is drawn from the customer premise wiring 16, and the diodes D1–D4 of FIG. 1 are essentially unbiased. Unbiased diodes present a high alternating current (AC) impedance in series with the POTS filter 12, thereby disconnecting (or isolating) the POTS filter 12 (and associated loading) from the customer premise wiring 16. This reduction in loading significantly reduces transmission loss and reduces sidetone degradation. In addition, the resistors R1, R2 shunt the leakage circuit around the diodes D1–D4 in the on-hook state, yet are a high enough impedance to maintain the POTS filter 12 in isolation from the customer premise wiring 16. The total impedance provides approximately 20 KΩ isolation. The resistors R1, R2 also support transmission of caller identification (ID) signals in a caller ID receiver that bridges the customer premise with high terminating impedance (e.g., non-terminating). Other high termination impedance services, such as message waiting, are also supported.

When a POTS communications device 33 transitions to an off-hook state from the on-hook state, a DC current in the range of between about 20 mA to about 100 mA is drawn from the customer premise wiring 16 through either the diodes D1, D4 or the diodes D3, D2, depending upon the polarity of tip and ring lines 16a, 16b. The parallel opposing diode pairs D1, D2 and D3, D4 ensure that a forward bias condition will exist on the diode pairs, regardless of the polarity of the tip and ring lines 16a, 16b (tip and ring reversal). The forward biased diodes, for example, D1 and D4 when the tip line 16a is positive with respect to the ring line 16b, present a very low AC impedance (approximately, 2 Ω) to the voice signal. The total forward DC voltage drop (1.4 volts DC at 20 mA) minimally impacts telephone performance. Further, the capacitors C1, C2 are designed to shunt high frequencies (such as DSL frequencies) around the diodes in order to minimize distortion. The DSL frequencies therefore experience the linear high impedance of the POTS filter 12 at tip and ring lines 21a, 21b.

As further shown in FIG. 1, the POTS filter 12 is cascaded with the automatic control mechanism 14 via tip and ring connections 21a, 21b. More specifically, the tip line circuitry 18a is connected between the customer premise wiring tip 16a and the POTS filter 12, and the ring line circuitry 18b is connected between the customer premise wiring ring line 16b and the POTS filter 12. The POTS filter 12 provides tip and ring connection 23a, 23b for connection to a POTS communications device, for example, a telephone, speaker phone, analog modem, facsimile machine, cordless telephone, etc. The POTS filter 12 can be implemented with any suitable circuitry, passive or active, for decoupling a POTS communications channel from the combined signal on the tip and ring connections 16a, 16b having the plurality of channels. The preferred embodiment of the POTS filter 12 utilizes a new specific implementation having improved sidetone, which design will be further described in detail later in this document in connection with FIG. 6.

Note that the POTS filter 12 of FIG. 1 is a one-to-one port device, unlike conventional POTS splitters, which are typically one-to-two port devices with one port receiving the combined signal and the other two each outputting a respective channel. However, the functionality of the POTS filter 12 and the POTS splitter are similar in that they both parse out a POTS channel from a communications connection having more than one communications channel. Accordingly, the POTS filter 12 of FIG. 1 can be implemented with a POTS splitter, if desired, by using only two of its ports. Many designs of POTS splitters are known in the art.

Figure 2:
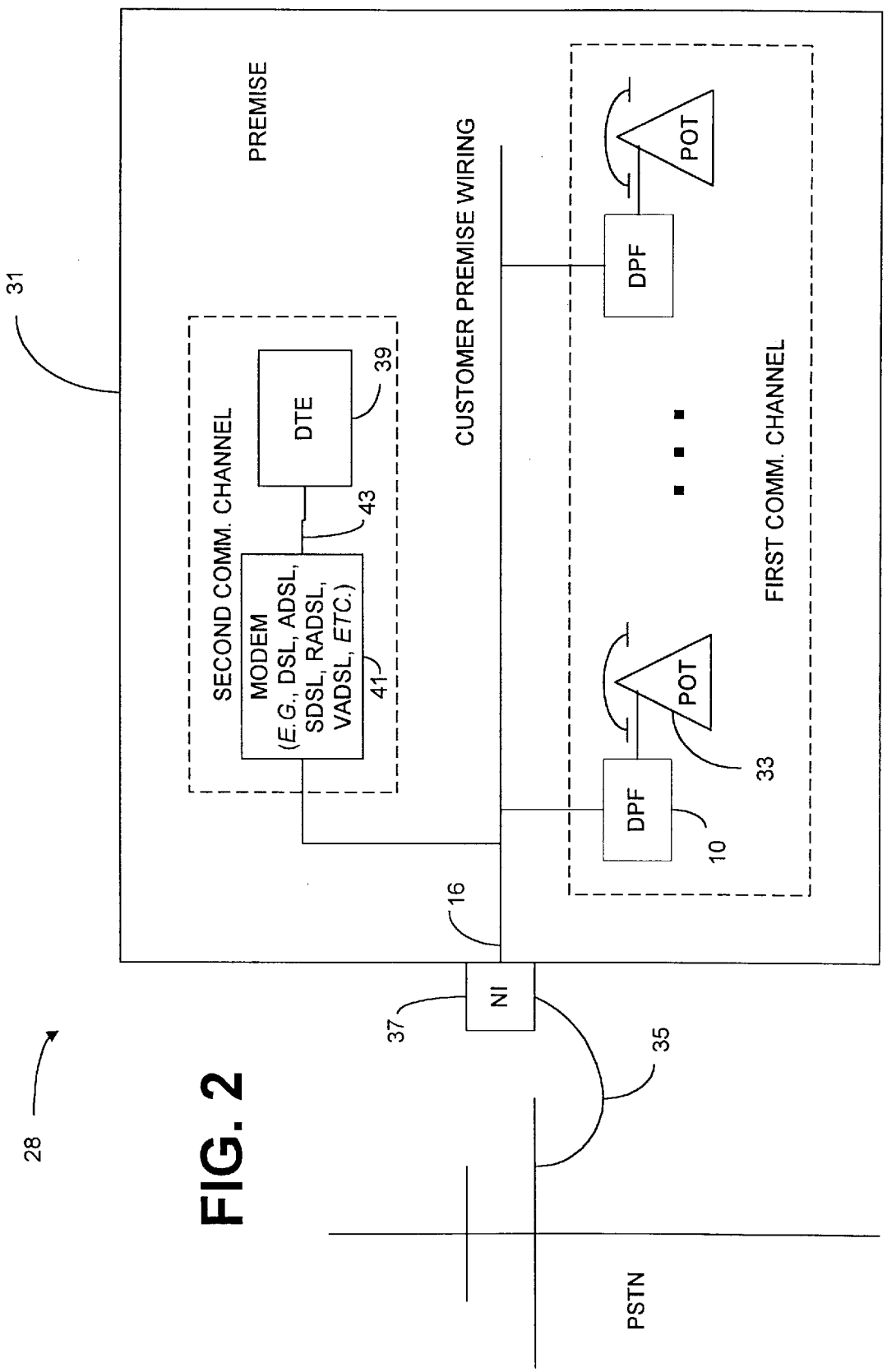
FIG. 2 is a physical view of a DPF system utilizing a plurality of the DPF of FIG. 1.

A DPF system 28 that utilizes a plurality n of DPFs 10 (FIG. 1) is shown in FIG. 2. Referring to FIG. 2, a customer premise 31 is shown with a plurality of telephones 33 having a DPF 10 connected in the series with each telephone 33, between the customer premise wiring 16 and each telephone 33. Any number of telephones 33 can be supported, up to the ringer equivalence number (REN) limit.

The customer premise wiring 16 can be connected to a telephone line 35 by way of a network interface (NI) 37. The network interface 37 is well known in the art.

Data terminal equipment (DTE) 39 can be interfaced with the customer premise wiring 16 by way of any suitable communications device 41, for instance, a data channel modem, in order to permit communications over a second communications channel. This second communications channel can exist concurrently with the first communications channel (POTS channel) on the telephone connection 35 without any appreciable interference to each, in accordance with the invention. A local connection 43 interconnects the DTE 39 with the communications device 41. In the preferred embodiment, the communications device 41 is a conventional digital subscriber line (DSL) modem.

Figure 3:
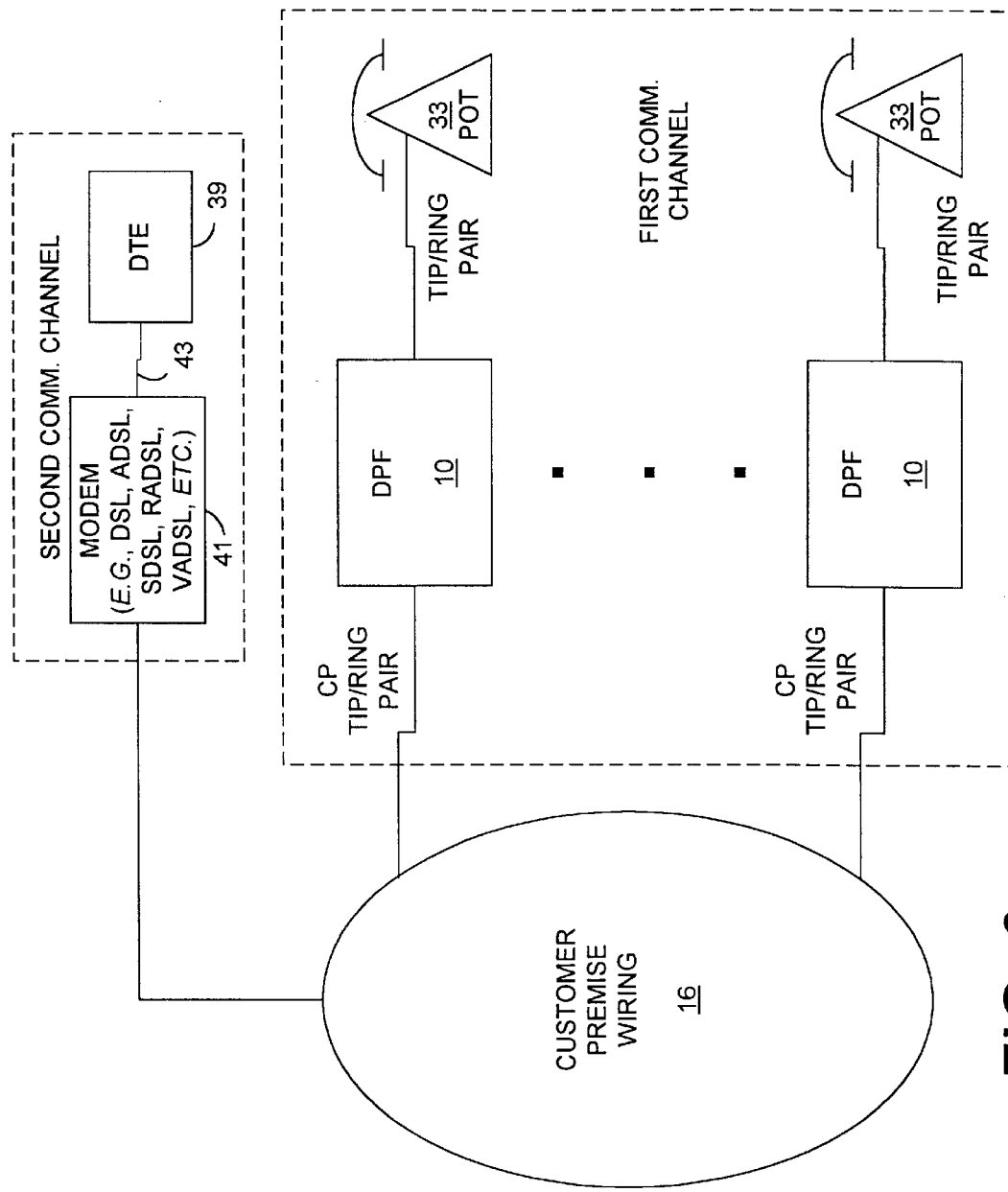
FIG. 3 is an abstract view of the DPF system of FIG. 2.

FIG. 3 is an abstract view of the DPF system 28 (FIG. 2) showing that the system 28 can be viewed as a plurality of parallel distributed POTS filter elements, each of which are situated between the customer premise wiring 16 and a respective telephone 33. As shown, these distributed POTS filter elements are in parallel with the second channel communications device, the DTE 39, relative to the customer premise wiring 16.

Figure 4:
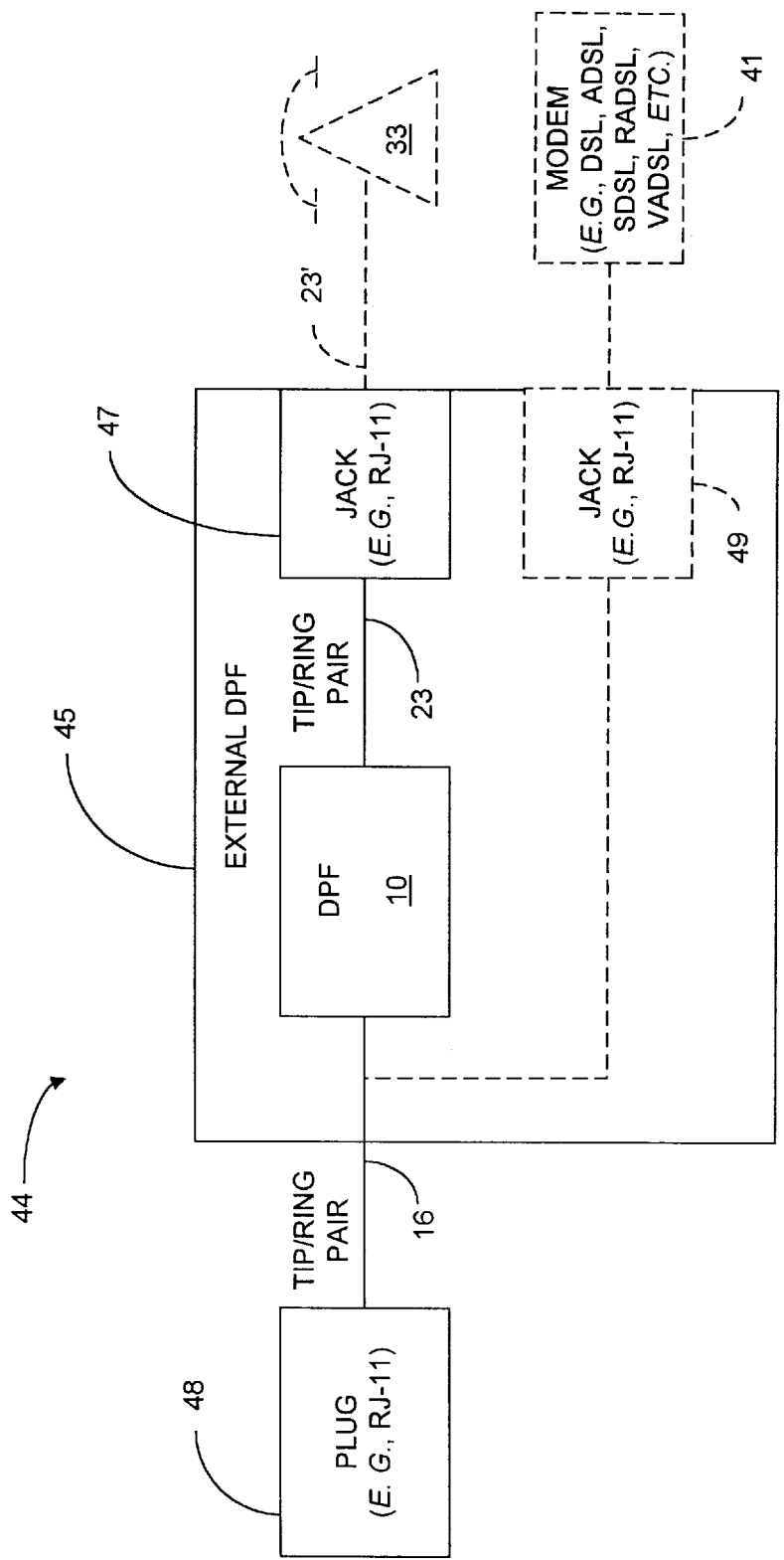
FIG. 4 is a physical view of an external DPF that is disposed external to a telephone.

The DPF 10 can be implemented in a simple user friendly configuration that is external to a telephone 33, as shown in FIG. 4. Referring to FIG. 4, in this embodiment, the DPF 10 is preferably situated within a suitable housing 45 having two ports: a jack 47 (e.g., RJ-11) and a plug 48 (e.g., RJ-11). The DPF 10 is electrically connected between the jack 47 and plug 48 so that the automatic control mechanism 14 is directly connected to the plug 48, and the POTS filter 12 is directly connected to the jack 47. Furthermore, for installation and operation, a telephone 33 or other POTS device is connected to the jack 47, and the plug 48 of the DPF apparatus 44 is connected to the customer premise wiring 16 via a mating jack (e.g., a wall outlet RJ-11 jack) associated with the customer premise wiring 16.

Optionally, as indicated by phantom lines in FIG. 4, the housing 45 may also include a jack 49 for connection to a second channel communications device, for example, an ADSL modem 41. In this embodiment, the jack 49 is connected to tip and ring lines 16 and the plug 48, as shown.

Figure 5:
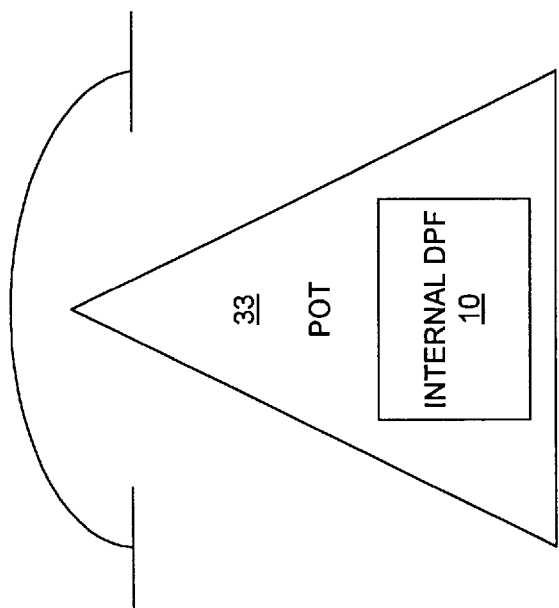
FIG. 5 is a physical view of an internal DPF that is disposed internal to a telephone.

The DPF 10 can also be implemented internally within a telephone 33, as illustrated in FIG. 5, between the telephone connection and the telephone circuitry (not shown for simplicity). This implementation results in several advantages: reduced cost due to one less housing, resulting in a reduced DSL deployment cost; reduced overall size; improved logistics in that there is no DPF 10 dangling on a telephone cord or the necessity to hide or replace the DPF 10; and a new product line for telephone manufacturers.

Figure 6:
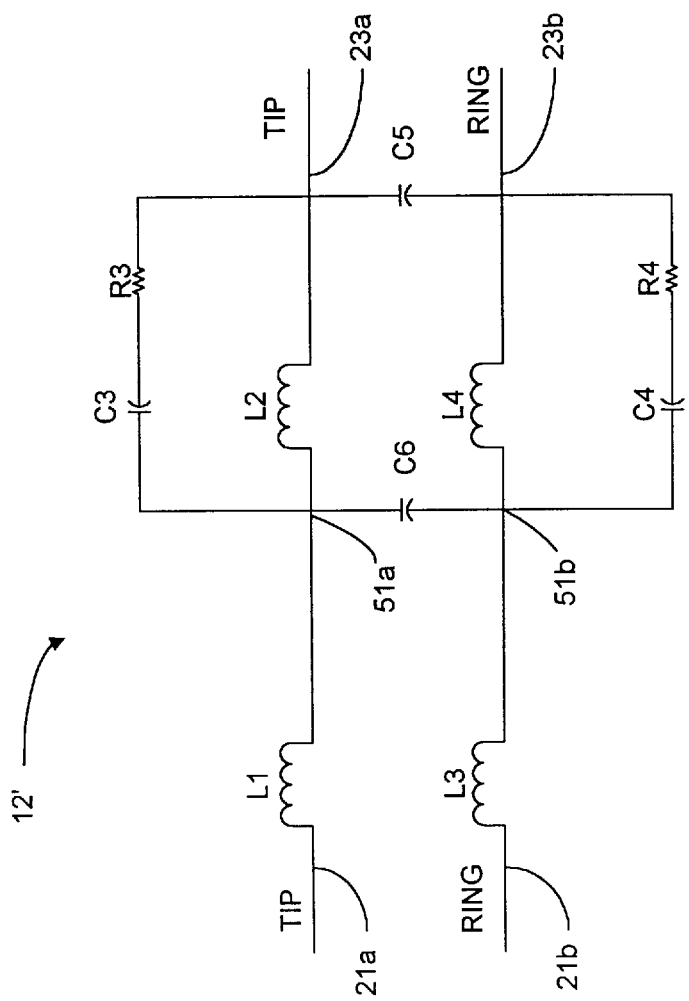
FIG. 6 is a circuit diagram of a possible implementation of a POTS filter of FIG. 1, which provides improved sidetone.

A possible implementation of the POTS filter 12 is shown in FIG. 6 and generally denoted by reference numeral 12'. The POTS filter 12' of FIG. 6 is preferred in that it has demonstrated excellent sidetone performance. Many conventional POTS filters demonstrate very poor sidetone performance. In general, the improved POTS filter 12' of FIG. 6 utilizes a tuning technique (tuning circuits C3, R3 and C4, R4) to improve sidetone, but is still a passive POTS filter device. The tuned frequency and quality factor Q are optimized to improve sidetone in the region most required, in this case, are optimized in the range between about 1 KHz and about 3 KHz.

More specifically, as shown in FIG. 6, the improved POTS filter 12' is a one-to-one port device. In general, it is implemented by modifying a balanced 5th-order 0.01 dB-ripple Chebyshev filter (note that the $5^{th}$ reactance component is based upon a 27 to 33 nF capacitance associated with the second channel communications device and which appears between connections 21a, 21b) with tuning circuit components, comprised of a capacitor (C3, C4) in series with a de-Q resistor (R3, R4, respectively) on each balanced side. In architecture, referring to FIG. 6, the improved POTS filter 12' includes, on the tip side, an inductor L1 connected to the tip line 21a from the automatic control mechanism 14 (FIG. 1). A series combination of a capacitor C3 and a resistor R3 is connected between the node 51a and a node 23a. Also, between the nodes 51a and 23a is an inductor L2. In the preferred embodiment, inductor L1, inductor L2, resistor R3, and capacitor C3 have the following circuit values: 8 mH, 8 mH, 100Ω, and 1 µF, respectively.

On the ring side of the circuit, an inductor L3 is connected to the ring line 21b. An inductor L4 is situated between the nodes 51b and 23b. Also, between these nodes 51b and 23b is situated a series combination of a capacitor C4 and a resistor R4. In the preferred embodiment, inductor L3, L4, resistor R4, and capacitor C4 have the following circuit values: 8 mH, 8 mH, 100 Ω, and 1 µF, respectively.

The inductors L1 and L3, as well as the inductors L2 and L4, may be implemented as mutually coupled inductors. In other words, the inductors L1 and L3 may be implemented with a first transformer, and/or the inductors L2 and L4 may be implemented with a second transformer. Use of these transformers may reduce the cost of the POTS filter 12'.

Several capacitors are connected between the tip and ring sides. In particular, a capacitor C5 is connected between tip and ring lines 23a, 23b. In the preferred embodiment, capacitor C5 is 27 nF. Further, a capacitor C6 is connected between the tip and ring lines 51a, 51b. In the preferred embodiment, the capacitor C6 is 56 nF.

When the improved POTS filter 12' is operational, the inductors L1, L3 provide high impedance to high frequencies, particularly those frequencies in the ADSL band. The capacitors C3, C4 resonate with the inductors L2, L4 in order to parallel resonate at the geometric mean of about 1 KHz and about 3 KHz. This feature improves telephone sidetone performance in the 1 to 3 KHz band by improving impedance (restoring the resistance and capacitive reactance) presented to the telephone 33 as compared to a pure L-C (inductor/capacitor) filter structure in prior art embodiments.

OPERATION

The overall operation of a DPF 10 is now described hereafter. Initially, assume that a respective telephone or other POTS communications device 33 is on-hook. In this case, the direct current (DC) resistance of the telephone 33 is greater than 5 M Ω. In this event, very little current is drawn from the customer premise wiring 16, and the diodes D1–D4 of FIG. 1 are essentially unbiased. With regard to POTS signals, the unbiased diodes present a high alternating current (AC) impedance in series with the POTS filter 12, thereby disconnecting (or isolating) the POTS filter 12 (and associated loading) from the customer premise wiring 16. This reduction in loading significantly reduces POTS transmission loss and reduces telephone sidetone degradation. In addition, the resistors R1, R2 shunt the leakage circuit around the diodes D1–D4 in the on-hook state, yet are a high enough impedance to maintain the POTS filter 12 in isolation from the customer premise wiring 16. The total impedance provides approximately 20 KΩ isolation.

When the POTS communications device 33 transitions to an off-hook state from the on-hook state, a DC current in the range of between about 20 mA to about 100 mA is drawn from the customer premise wiring 16 through the diodes D1, D4. The parallel opposing diodes D2, D3, respectively, ensure that a forward biased condition will exist on one of the two diodes D1, D2 in the tip circuitry 18a and one of the two diodes D3, D4 of ring circuitry 18b, regardless of the polarity of the tip and ring lines 16a, 16b (tip and ring reversal). The forward biased diodes present a very low AC impedance (approximately, 2 Ω each diode) to the voice signal. The total forward DC voltage drop (1.4 volts DC at 20 mA) minimally impacts telephone performance.

The capacitors C1, C2 shunt high frequencies (such as DSL frequencies) around the diodes in order to minimize distortion. Furthermore, the first inductor stage of the POTS filter 12 provides high impedance to high frequencies (e.g., ADSL frequencies).

Accordingly, the DPF 10 acts as an automatic switch in that it disconnects (isolates) the POTS filter 12 when the telephone 33 is on-hook and connects (interfaces) the POTS filter 12 when the telephone is off-hook. This action is totally transparent to the user, as all telephone functions work as usual (ringing, pulse, and tone dialing, voice communication, etc.).

Many variations and modifications may be made to the preferred embodiment of the invention without departing substantially from the spirit and principles of the invention. For example, although not an optimal configuration, the automatic control mechanism 14 may be implemented with an unbalanced circuit (essentially with either circuitry 18a or 18b, not both) or with an electrically equivalent set of circuit components. As another example, again, although not an optimal configuration, the POTS filter 12' may be implemented with an unbalanced circuit (essentially with either L1, L2, C3, C5, C6, R3 or L3, L4, C4, C5, C6, R4) or with an electrically equivalent set of circuit components. All such modifications and variations are intended to be included herein within the scope of the present invention, as is defined by the following claims.

In the claims set forth hereinafter, the structures, materials, acts, and equivalents of all "means" elements and "logic" elements are intended to include any structure(s), material(s), or act(s) for performing the functions specified in connection with the elements.

I claim:

1. A passive distributed filter for enabling decoupling of first and second simultaneous communications channels on a telephone connection, comprising:

a first channel filter configured to decouple a first channel from a combined signal having said first channel and a second channel on said telephone connection; and an automatic control mechanism configured to isolate said first channel filter from said telephone connection when a first channel device connected thereto is on-hook and configured to interface said first channel filter with said telephone connection when said first channel device is off-hook.

2. The filter of claim 1, wherein said first channel filter is a POTS filter and said first channel is a POTS channel.

3. The filter of claim 1, wherein said first and second channels utilize different frequency ranges.

4. The filter of claim 1, wherein said first channel filter comprises a balanced $5^{th}$ order Chebyshev filter with a tuning circuit configured to enhance telephone sidetone response between about 1 KHz and about 3 KHz.

5. The filter of claim 1, wherein said first channel filter comprises:

cascaded first and second inductance circuits on each of tip and ring connections; and a capacitance circuit in parallel with each second inductance circuit and configured to resonate with a corresponding second inductance circuit.

6. The filter of claim 2, wherein said second channel is a digital subscriber line (DSL) channel.

7. The filter of claim 5, wherein each of said first and second inductance circuits comprise a pair of mutually coupled inductors.

8. The system of claim 1, wherein said automatic control mechanism includes parallel opposing diodes connected to said telephone connection.

9. A telephone for connecting to a telephone connection having a POTS channel combined with a second communications channel, comprising:

a POTS filter configured to decouple said POTS channel from a combined signal having said POTS channel and said second communications channel on said telephone connection; and an automatic control mechanism configured to isolate said POTS filter from said telephone connection when said telephone is on-hook and configured to interface said POTS filter with said telephone connection when said telephone is off-hook.

10. A distributed filter apparatus for connecting a POTS communication device to a telephone connection having a POTS channel and a second communications channel and for decoupling the POTS channel, comprising:

a housing with first and second ports, said first port adapted for connection to said telephone connection and said second port adapted for connection to said POTS communication device;

a POTS filter within said housing and connected to said second port, said POTS filter configured to decouple said POTS channel from a combined signal having said POTS channel and said second communications channel on said telephone connection; and an automatic control mechanism within said housing and connecting said POTS filter and said first port, said automatic control mechanism configured to isolate said POTS filter from said telephone connection when said POTS communications device is on-hook and configured to interface said POTS filter with said telephone connection when said POTS communications device is off-hook.

11. The apparatus of claim 10, further comprising a third port associated with said housing configured to connect a second communications device adapted to utilize said second communications channel with said telephone connection.

12. A passive distributed filter system for enabling decoupling of first and second communications channels on a telephone connection, comprising:

a plurality of first communications devices;

a plurality of distributed filters corresponding respectively with and connecting each of said first communications devices to said telephone connection, each said distributed filter comprising an automatic control mechanism and a first channel filter, said automatic control mechanism configured to isolate said first channel filter when a respective first communications device is inactive, said distributed filter configured to interface communications on a first channel on said telephone connection with said respective first communications device when said first communications device is active; and a second communications device connected to said telephone connection and communicating signals over a second channel.

13. The system of claim 12, wherein said first channel filter is a POTS filter.

14. The system of claim 12, wherein said first channel is a POTS channel and said second channel is a DSL channel.

15. The system of claim 12, wherein said first and second channels utilize different frequency ranges.

16. The system of claim 12, wherein said first channel filter comprises a balanced $5^{th}$ order Chebyshev filter with a tuning circuit configured to enhance frequency response between about 1 KHz and about 3 KHz.

17. The system of claim 12, wherein said first channel filter comprises:

cascaded first and second inductance circuits on each of tip and ring connections; and a capacitance circuit in parallel with each second inductance circuit and configured to resonate with a corresponding second inductance circuit.

18. The system of claim 14, wherein said automatic control mechanism includes parallel opposing diodes connected to said telephone connection.

19. A passive distributed POTS filter system for enabling decoupling of a POTS channel and a second communications channel on a telephone connection, comprising:

a plurality of POTS communications devices;

a plurality of distributed POTS filters corresponding respectively with and connecting each of said POTS communications devices to said telephone connection, each said distributed POTS filter comprising an automatic control mechanism and a POTS filter, said automatic control mechanism configured to isolate said POTS filter when a respective POTS communications device is on-hook, said distributed POTS filter configured to permit POTS communications over a POTS channel on said telephone connection with said respective POTS communications device when said POTS communications device is off-hook; and a second communications device connected to said telephone connection and communicating signals over a second channel, said POTS and second channels being communicated over said telephone connection concurrently.

20. The system of claim 19, wherein said second channel is a DSL channel.

21. The system of claim 19, wherein said POTS filter comprises a balanced $5^{th}$ order Chebyshev filter with a tuning circuit configured to enhance frequency response between about 1 KHz and about 3 KHz.

22. The system of claim 19, wherein said POTS filter comprises:

cascaded first and second inductance circuits on each of tip and ring connections; and a capacitance circuit in parallel with each second inductance circuit and configured to resonate with a corresponding second inductance circuit.

23. A method for implementing a passive distributed filter system for enabling decoupling of first and second communications channels on a telephone connection at a plurality of sites, comprising the steps of:

interfacing a plurality of first channel communications devices with said telephone connection using a distributed filter, said first channel communications devices configured to communicate over said telephone connection via a first channel, said distributed filter comprising an automatic control mechanism and a first channel filter, said automatic control mechanism configured to isolate said first channel filter when a respective first communications device is inactive, said distributed filter configured to interface communications on a first channel on said telephone connection with said respective first communications device when said first communications device is active; and interfacing a second channel communications device to said telephone connection, said second channel communications device configured to communicate over said telephone connection via a second channel; and permitting noninterfering simultaneous communications via said first and second channels over said telephone connection.

24. The method of claim 23, further comprising the step of using POTS filters as said first channel filters and a POTS channel as said first channel.

25. The method of claim 23, further comprising the step of utilizing different nonoverlapping frequency ranges for said first and second channels.

26. The method of claim 23, further comprising the steps of:

utilizing a POTS channel as said first channel; and utilizing a digital subscriber line (DSL) channel as said second channel.

27. The method of claim 23, further comprising the step of utilizing a tuning circuit in said distributed filter to enhance frequency response between about 1 KHz and about 3 KHz.

\* \* \* \* \*

UNITED STATES PATENT AND TRADEMARK OFFICE
CERTIFICATE OF CORRECTION

PATENT NO. : 5,848,150
DATED : December 8, 1998
INVENTOR(S) : Bingel

It is certified that error appears in the above-identified patent and that said Letters Patent is hereby corrected as shown below:

Column 4, line 45, "a" should be deleted.

Column 6, line 50, "tip and ring lines 16" should be --tip and ring lines 16a, 16b--.

Column 8, line 57, "a first channel" should be --said first channel--.

Column 8, lines 58-59, "a second channel" should be --said second channel--.

Column 10, line 6, "a first channel" should be --said first channel--.

UNITED STATES PATENT AND TRADEMARK OFFICE
CERTIFICATE OF CORRECTION

PATENT NO. : 5,848,150
DATED : December 8, 1998
INVENTOR(S) : Bingel

It is certified that error appears in the above-identified patent and that said Letters Patent is hereby corrected as shown below:

Column 10, lines 10-11, "a second channel" should be said --second channel--.

Column 10, line 44, "a POTS channel" should be --said POTS channel--.

Column 10, lines 49-50, "over a second channel" should be --over said second channel--.

Column 11, line 7, "a first channel" should be --said first channel--.

Column 11, line 13, "a first channel" should be --said first channel--.

Column 11, line 19, "a second channel" should be --said second channel--.

Signed and Sealed this

Twenty-second Day of June, 1999

Attest:

Q. TODD DICKINSON

*Attesting Officer*  *Acting Commissioner of Patents and Trademarks*